No. 775,722. PATENTED NOV. 22, 1904.
L. P. FAISON.
FRICTION TREAD FOR VEHICLE TIRES.
APPLICATION FILED JUNE 28, 1904.
NO MODEL.

Witnesses

Inventor
L. P. Faison
By
Chandler & Chandler
Attorneys

No. 775,722. Patented November 22, 1904.

UNITED STATES PATENT OFFICE.

LEO P. FAISON, OF GOLCONDA, NEVADA.

FRICTION-TREAD FOR VEHICLE-TIRES.

SPECIFICATION forming part of Letters Patent No. 775,722, dated November 22, 1904.

Application filed June 28, 1904. Serial No. 214,690. (No model.)

*To all whom it may concern:*

Be it known that I, LEO P. FAISON, a citizen of the United States, residing at Golconda, in the county of Humboldt, State of Nevada, have invented certain new and useful Improvements in Friction-Treads for Vehicle-Tires; and I do hereby declare the following to be a full, clear, and exact description of the invention, such as will enable others skilled in the art to which it appertains to make and use the same.

This invention relates to vehicle-tires; and it has for its object to provide a friction-tread which may be applied to and removed from the wheel quickly, which will be held securely in place, and which will insure against slipping of the wheel in sand or in slippery places.

Other objects and advantages of the invention will be understood from the following description.

Figure 1:
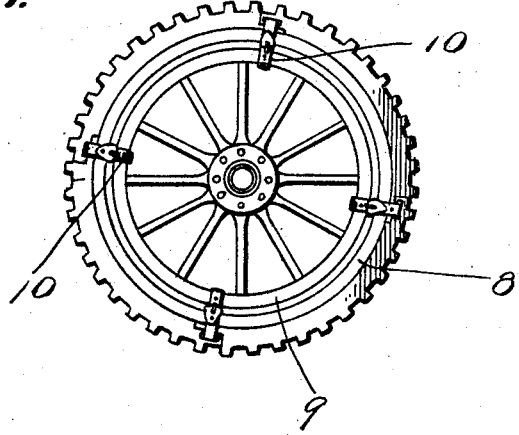
Figure 2:
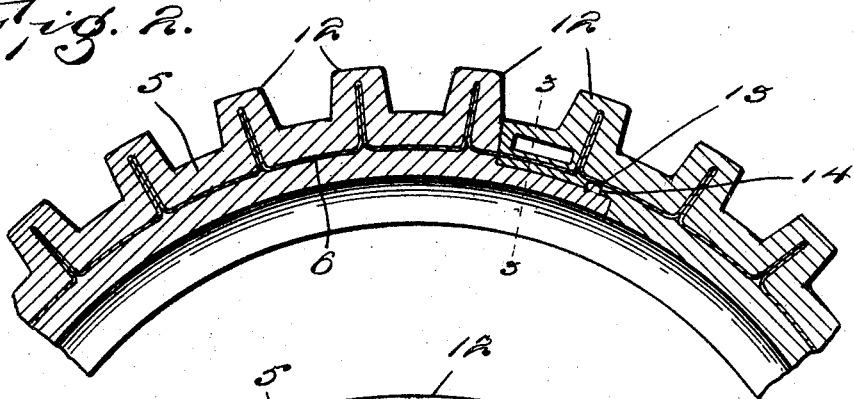
Figure 3:
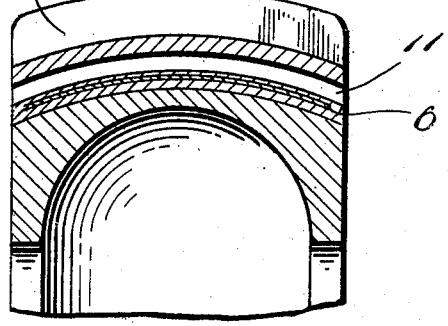

In the drawings forming a portion of this specification, in which like numerals of reference indicate similar parts in the several views, Figure 1 is an elevation showing a wheel equipped with the present invention. Fig. 2 is a vertical section through a portion of a tire embodying the present invention. Fig. 3 is a transverse section through the adjacent end portions of a tread-section.

Referring now to the drawings, the present tread member comprises sections each of which consists of a strip 5 of rubber, having embedded therein a fabric 6, the inner face of the strip being concaved and transversely arc-shaped, the strip being adapted to be bent circumferentially about a portion of the tire 8 of a wheel 9, in which position it is held by straps 10, passed through transverse openings 11 in the strip and around the tire and felly of the wheel. From the outer face of the strip project teeth 12 or cogs having the same general form and arrangement of the teeth or cogs of an ordinary cog-wheel, these teeth or cogs being formed, preferably, integral with the strip and having the fabric 6 carried up into them, so that they will not be torn off in use.

The several sections which form the complete tread are arranged end to end, and they may be halved at their ends and overlapped so that a single strap will serve to hold the ends of two adjacent sections close upon the wheel. To further hold the sections together, the underlying portion of each section may have a lug 13, entering a corresponding recess 14 in the bottom of the next section and lying behind the adjacent strap. By this means longitudinal separation of the sections will be prevented.

With the present construction it will be understood that there is provided means for equipping the wheels of an automobile or other traction machines to prevent slipping of the wheels, the sections being easily and quickly applied and removed.

In practice modifications of the specific construction shown may be made and any suitable materials and proportions may be used for the various parts without departing from the spirit of the invention.

What is claimed is—

1. A friction-tread for vehicle-tires provided with cogs on its outer face, said tire having a strengthening fabric embedded therein and extending into the cogs.

2. A friction-tread for vehicle-tires comprising sections of flexible material concaved in their inner faces to receive the tire and having cogs on their outer faces and transverse passages through their ends, the ends of mutually-adjacent sections being halved together and attaching-straps engaged through the transverse passages.

3. An article of the class described, consisting of a rubber body portion having cogs and a fabric embedded in the body portion and folded at intervals, the folded portions extending into the cogs.

In testimony whereof I affix my signature in presence of two witnesses.

LEO P. FAISON.

Witnesses:
J. W. MCCRARY,
D. N. SMITH.